Feb. 21, 1928.
J. DURKA
1,660,154
AUTOMOBILE SAFETY DEVICE
Filed April 18, 1927
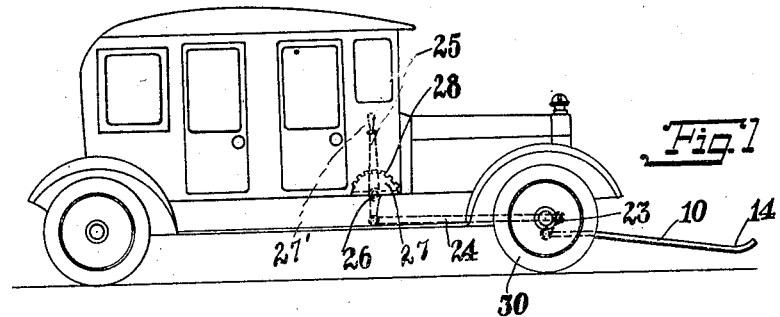
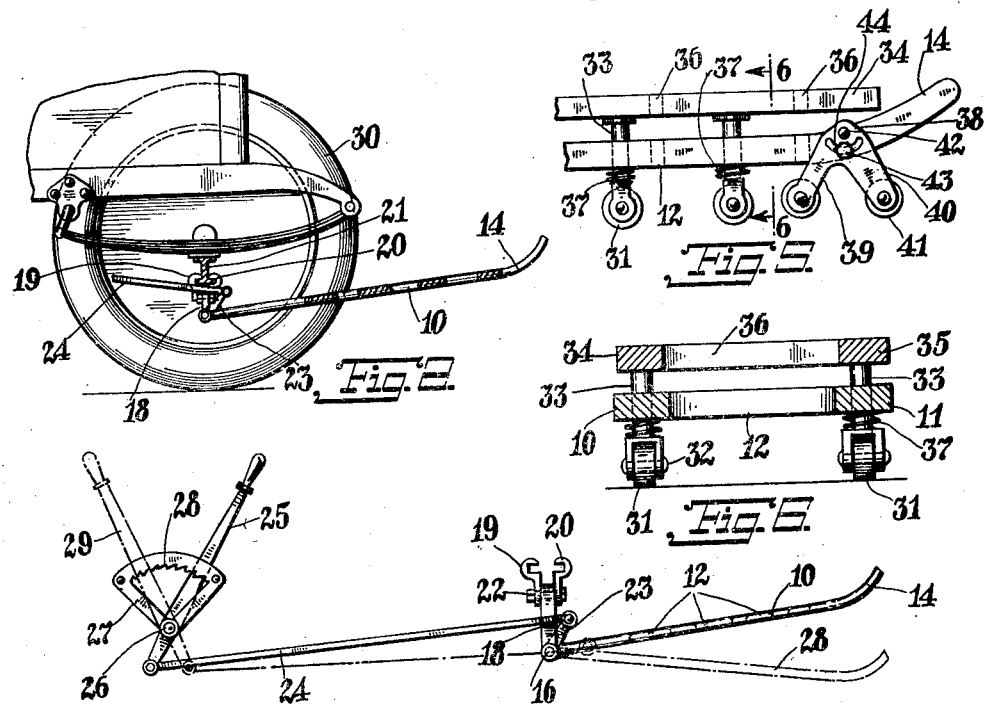
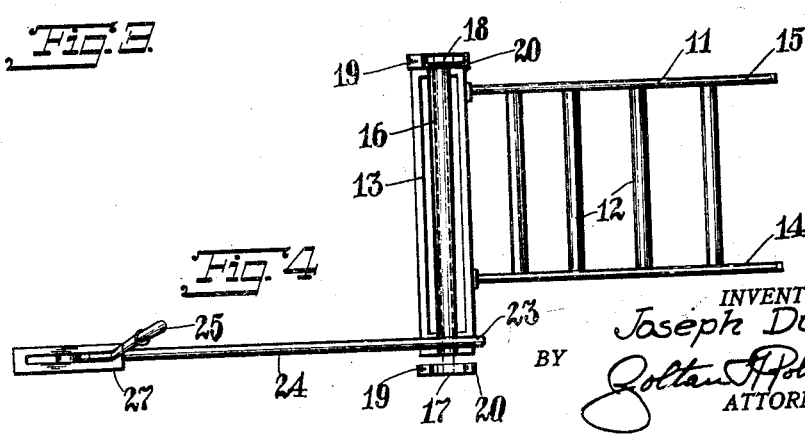
INVENTOR
Joseph Durka
BY
Zoltan Polachek
ATTORNEY Patented Feb. 21, 1928.

1,660,154

UNITED STATES PATENT OFFICE.

JOSEPH DURKA, OF TOLEDO, OHIO.

AUTOMOBILE SAFETY DEVICE.

Application filed April 18, 1927. Serial No. 184,602.

This invention relates to a new and useful device in the nature of an automobile safety device, particularly adapted to be attached to motor vehicles for the purpose of preventing persons from being run over by the said motor vehicle.

The object of the invention is to provide an automobile safety device of novel construction and arrangement of parts, hereinafter more fully described, claimed, and illustrated in the accompanying drawing.

Fig. 1 is a side elevational view of a motor vehicle equipped with my improved safety device.

Fig. 2 is an enlarged fragmentary view of a motor vehicle illustrating in particular the method of attaching my improved device thereto.

Fig. 3 is a side elevational view of my improved device.

Fig. 4 is a top plan view thereof.

Fig. 5 is a fragmentary side elevational view thereof, illustrating a further development of my improved device.

Fig. 6 is a transverse sectional view thereof.

As here embodied my improved device comprises a frame work or platform consisting of side members 10 and 11, having attached thereto cross members 12. The side members 10 and 11, are attached to and extended from the tubular member 13. The extended extremities of the side members 10 and 11 are bent, formed, or curved upwardly, as at 14 and 15. The tubular member 13 is pivotally mounted on the rod 16. The brackets 17 and 18 are attached to the rod 16, at or near the extremities thereof, and are extended upwardly therefrom. The clamping members 19 and 20, are adapted to engage the front axle center or I beam, 21, of a motor vehicle. The brackets 17 and 18 are attached, as at 22, by bolts, rivets, or the like, to the clamping members 19 and 20. The lever 23, is attached to the tubular member 13. The rod 24, is attached at one extremity to the extended extremity of the lever 23, and is attached at its other extremity to one extremity of the operating lever 25. The operating lever 25 is pivotally attached as at 26, intermediately thereof, to the section 27 provided with teeth 28 or serrations, adapted to engage similar teeth formed in the operating lever 25. The operating lever 25 is provided with a handle element 27'. The operating lever 25 is positioned preferably in proximity to the control levers of the motor vehicle, within easy and ready reach of the operator of the said motor vehicle. The sector 27 is attached to the chassis frame, or body of the said motor vehicle.

The above described construction being such as will permit the above described platform to be normally held in a raised position, or to be lowered in close proximity to the ground, as designated by the reference numeral 28', when the operating lever 25, is pulled, forced, or pivoted on the sector 27, as designated by the reference numeral 29.

It is obvious that my improved device when in a lowered position will pick up a person, who might otherwise be run over by the front wheels of the motor vehicle, it being understood that my improved device extends materially in front of the front wheels 30, of the motor vehicle.

In Figures 5 and 6, of the accompanying drawing, I have shown a plurality of wheels 31 of comparatively small diameter, rotatively mounted on the pins 32 carried in the lower portions of the brackets 33. The brackets 33 are slidably mounted in apertures formed in the above mentioned side members 10 and 11, and are extended upwardly therefrom. The brackets 33 are attached at their extended extremities to the side members 34 and 35, which have attached thereto cross members 36. The said side members 34 and 35, and the cross members 36, comprise a supplementary frame work or platform. The wheels 31 are normally held in a downwardly extended position by the expansion springs 37, wound on the brackets 33 positioned intermediate the side members 10 and 11 and the enlarged portions of the brackets 33. A U-shaped bracket 38 comprising leg elements 39 and 40 is pivotally mounted by a pin 42 on each side member 10 and 11 and is provided at the extremities of the leg elements 39 and 40 with a roller 41. The brackets 38 have an arcuate slot 44 therethrough for receiving a nut and bolt 43 which are adapted to be tightened for securing the bracket in a desired position. It should be understood that the brackets 38 support the forward ends of the side members 10 and 11 and that they may be adjusted for holding the forward ends at a desired elevation. The above described construction is such as will permit the supplementary platform to pick up a person, and which will permit the wheels 31 to make contact with the ground, in event of a sudden impact or excessive weight, so as to allow my improved device to be carried along, or supported in front of the motor vehicle to which same is attached until such a time, as the operator of the said motor vehicle is able to stop the said motor vehicle.

Having thus described my invention, what I claim as new and desire to protect by Letters Patent of the United States is as follows:

1. In an automobile safety device of the class described, a platform attached to and extended from a tubular member, said tubular member pivotally mounted on a rod, clamping members adapted to engage the front axle center of a motor vehicle, brackets attached to the said rod and to the said clamping members.

2. In an automobile safety device of the class described, a platform attached to and extended from a tubular member, said tubular member pivotally mounted on a rod, clamping members adapted to engage the front axle center of a motor vehicle, brackets attached to the said rod and to the said clamping members, a lever attached to the said rod, a second rod attached to the said lever and to an operating lever, said operating lever pivotally attached intermediate thereof to a sector, said sector positioned in proximity to the control levers of a motor vehicle, said sector attached to the chassis frame of the said motor vehicle.

3. In an automobile safety device of the class described, a platform pivotally attached to the front of an automobile comprising side members having apertures therein, brackets slidably mounted in said apertures and extending upwardly above said platform, a second platform mounted on the upper ends of said brackets above said pivotally mounted platform, wheels rotatively mounted on the lower ends of said brackets, and actuating mechanism for lowering and raising said platforms.

In testimony whereof I have affixed my signature.

JOSEPH DURKA.